(12) United States Patent
Strasser et al.

(10) Patent No.: US 6,614,953 B2
(45) Date of Patent: Sep. 2, 2003

(54) MODULAR ALL-OPTICAL CROSS-CONNECT

(75) Inventors: Thomas Andrew Strasser, Warren, NJ (US); Per Bang Hansen, Rumson, NJ (US); Jefferson L. Wagener, New Hope, PA (US)

(73) Assignee: Photuris, Inc., Piscataway, NJ (US)

( * ) Notice: Subject to any disclaimer, the term of this patent is extended or adjusted under 35 U.S.C. 154(b) by 0 days.

(21) Appl. No.: 10/098,746

(22) Filed: Mar. 15, 2002

(65) Prior Publication Data

US 2002/0146198 A1 Oct. 10, 2002

Related U.S. Application Data

(60) Provisional application No. 60/276,310, filed on Mar. 16, 2001.

(51) Int. Cl.[7] .............................. H04S 14/02; G02B 6/26
(52) U.S. Cl. .............................. 385/17; 385/24; 385/15; 385/16; 359/124; 359/128; 359/115; 359/117; 359/127; 359/139
(58) Field of Search ............................ 385/24, 17, 42, 385/47, 15, 16, 18; 359/124, 128, 115, 117, 127, 139

(56) References Cited

U.S. PATENT DOCUMENTS

| | | | | |
|---|---|---|---|---|
| 5,774,245 A | * | 6/1998 | Baker | 359/128 |
| 5,870,216 A | * | 2/1999 | Brock et al. | 359/172 |
| 6,195,187 B1 | * | 2/2001 | Soref et al. | 359/114 |
| 6,201,909 B1 | * | 3/2001 | Kewitsch et al. | 385/37 |
| 6,256,125 B1 | * | 7/2001 | Uehara | 359/124 |
| 6,288,810 B1 | * | 9/2001 | Grasso et al. | 359/127 |
| 6,292,599 B1 | * | 9/2001 | Augustsson | 385/16 |
| 6,351,581 B1 | * | 2/2002 | Doerr et al. | 359/124 |

* cited by examiner

*Primary Examiner*—Brian Healy
(74) *Attorney, Agent, or Firm*—Mayer Fortkort & Williams, PC; Stuart H. Mayer, Esq.

(57) ABSTRACT

An all-optical, optical cross-connect includes first and second pluralities of multiport optical devices. Each of the first plurality of multiport optical devices have at least one input port for receiving a WDM optical signal and a plurality of output ports for selectively receiving one of more wavelength components of the optical signal. Each of the second plurality of multiport optical devices have a plurality of input ports for selectively receiving one of more wavelength components of the optical signal and at least one output port for selectively receiving one of more wavelength components of the optical signal. At least one of the first or second plurality of multiport optical devices are all-optical switches that can route every wavelength component independently of every other wavelength component. The plurality of input ports of the second plurality of multiport optical devices are optically coupled to respective ones of the plurality of output ports of the first plurality of multiport optical devices.

37 Claims, 6 Drawing Sheets

BIDIRECTIONAL INPUTS/OUTPUTS WITH INDEPENDENT WAVELENGTH DISTRIBUTION

OPTIMUM OXC TECHNOLOGY FOR DIFFERENT NUMBER
OF WAVELENGTHS AND INTERFACES AS DEFINED
BY THE MINIMUM NUMBER OF INTERCONNECTIONS REQUIRED

THE SCALING OF THE NUMBER OF INTERCONNECTIONS REQUIRED TO BUILD AN OXC USING CONVENTION MxM SWITCH TECHNOLOGY AND THE NEW OPTICAL SWITCH

US 6,614,953 B2

MODULAR ALL-OPTICAL CROSS-CONNECT

STATEMENT OF RELATED APPLICATION

This application claims the benefit of priority to U.S. Provisional Patent Application No. 60/276,310, filed Mar. 16, 2001, entitled "Reconfigurable Optical System."

FIELD OF THE INVENTION

The invention relates generally to wavelength division multiplexed optical communication systems, and more particularly, to a modular, all-optical cross-connect that may be employed in wavelength division multiplexed optical communication systems.

BACKGROUND OF THE INVENTION

Wavelength division multiplexing (WDM) has been explored as an approach for increasing the capacity of fiber optic networks to support the rapid growth in data and voice traffic applications. A WDM system employs plural optical signal channels, each channel being assigned a particular channel wavelength. In a WDM system, signal channels are generated, multiplexed, and transmitted over a single waveguide, and demultiplexed to individually route each channel wavelength to a designated receiver. Through the use of optical amplifiers, such as doped fiber amplifiers, plural optical channels are directly amplified simultaneously, facilitating the use of WDM systems in long-distance optical systems.

Recently, switching elements that provide a degree of reconfigurability have become available. These reconfigurable optical elements can dynamically change the path along which a given wavelength is routed to effectively reconstruct the topology of the network as necessary to accommodate a change in demand or to restore services around a network failure. Examples of reconfigurable optical elements include optical Add/Drop Multiplexers (OADM) and Optical Cross-Connects (OXC). OADMs are used to separate or drop one or more wavelength components from a WDM signal, which is then directed onto a different path. In some cases the dropped wavelengths are directed onto a common fiber path and in other cases each dropped wavelength is directed onto its own fiber path. OXCs are more flexible devices than OADMs, which can redistribute in virtually any arrangement the components of multiple WDM input signals onto any number of output paths. FIG. 1 shows a conventional cross-connect 100 that has two input ports $101_1$ and $101_2$ and output ports $103_1$ and $103_2$, which can each communicate a WDM signal having N channels or wavelengths $\lambda_1$–$\lambda_N$. Each WDM input and output port is coupled to a demultiplexer and multiplexer, respectively. Specifically, cross-connect 100 includes demultiplexers $105_1$ and $105_2$, and multiplexers $107_1$ and $107_2$. Cross-connect 100 also includes M×M switching fabric 109, where M is equal to N times the number of WDM input/output ports (m). In the example shown in FIG. 1, M is equal to 2N. Switching fabric 109 is traditionally an electronic switching core such as a digital cross-connect, however for current high capacity optical systems this is being replaced with an optical switching system.

Unfortunately, because current OXC's optical switches have a relatively high insertion loss, they require optical-to-electrical interfaces and regenerators into and out of the cross-connect. While these regenerators overcome the problem of insertion loss and effectively allow wavelength conversion of the signal as it traverses the switching fabric, they substantially add to the cost of an already expensive switching fabric because a regenerator is required for each and every wavelength that is used in the network.

Another limitation of the aforementioned conventional OXC is that it is difficult to increase the number of input and output ports when such additional capacity is needed sometime after the OXC is initially installed and operational. In order to provide such modularity, the switching fabric 109 as initially installed must include its maximum anticipated capacity, because otherwise the loss and number of connections increase too rapidly. In other words, it is impractical to provide an M×M switching fabric that is itself modular. This limitation may be mitigated to a small degree by packaging demultiplexers and monitoring detectors outside the M×M switching fabric in modules that can be installed incrementally, but since the switching fabric is the most expensive component in the OXC, the advantages of providing a conventional OXC that is modular are limited.

Accordingly, it would be desirable to provide a low-loss optical cross-connect in which modular functionality can be provided in a relatively easy and inexpensive manner.

SUMMARY OF THE INVENTION

In accordance with the present invention, an all-optical, optical cross-connect is provided, which includes first and second pluralities of multiport optical devices. Each of the first plurality of multiport optical devices have at least one input port for receiving a WDM optical signal and a plurality of output ports for selectively receiving one of more wavelength components of the optical signal. Each of the second plurality of multiport optical devices have a plurality of input ports for selectively receiving one of more wavelength components of the optical signal and at least one output port for selectively receiving one of more wavelength components of the optical signal. At least one of the first or second plurality of multiport optical devices are all-optical switches that can route every wavelength component independently of every other wavelength component. The plurality of input ports of the second plurality of multiport optical devices are optically coupled to respective ones of the plurality of output ports of the first plurality of multiport optical devices.

In accordance with one aspect of the invention, both pluralities of multiport optical devices are all-optical switches that can route every wavelength component independently of every other wavelength component. Alternatively one of the plurality of multiport optical devices may be optical couplers.

In accordance with another aspect of the invention, the all-optical switch includes a plurality of wavelength selective elements that each select a channel wavelength from among the plurality of wavelength components received at the input port. A plurality of optical elements are respectively associated with the plurality of wavelength selective elements. Each of the optical elements direct one of the selected wavelength components selected by the associated wavelength selective element to any one of the output ports independently of all other channel wavelengths.

In accordance with yet another aspect of the invention, an all-optical, optical cross-connect is provided which includes a first set of m reconfigurable all-optical switches, where m is $\infty$ 3. Each of the reconfigurable switches have at least (m+1) prearranged ports for receiving one or more wavelength components of a WDM optical signal. The reconfigurable switches selectively directing any wavelength component from one of the prearranged ports to any of the remaining ones of the prearranged ports independently of every other wavelength component. A second set of m reconfigurable all-optical switches are also provided, which each have at least (m+1) particular ports for receiving one or more wavelength components of a WDM optical signal. The reconfigurable switches in the second set route any wavelength component from one of the particular ports to any of the remaining ones of the particular ports independently of every other wavelength component. Each of the prearranged ports of each reconfigurable switch in the first set of switches is optically coupled to a particular port of a different reconfigurable switch in the second set of switches.

DETAILED DESCRIPTION

In accordance with the present invention, an all-optical, modular OXC is provided which employs reconfigurable switching elements, which are all-optical switching elements that perform both multiplexing/demultiplexing functions and wavelength-selective routing functions. As a result, the present invention avoids the need for distinct multiplexing/demultiplexing elements and switching elements, as required by the aforementioned conventional OXC's. Because the present invention employs such reconfigurable switching elements, the capacity of the OXC can be increased in a modular fashion. Moreover, the all-optical reconfigurable switches can be arranged to provide OXC's that have much lower insertion losses and are less expensive than the aforementioned conventional OXC's.

Various examples of all-optical reconfigurable optical switches that may be employed in the present invention are disclosed in U.S. patent application Ser. No. 09/571,833, which is hereby incorporated by reference in its entirety, and in particular FIGS. 2–4 of that reference. The reconfigurable switching elements disclosed therein can selectively direct any wavelength component from any input port to any output port, independent of the routing of the other wavelengths, without the need for any electrical-to-optical conversion. Another all-optical reconfigurable optical switch that provides additional functionality is disclosed in U.S. patent application Ser. No. 09/691,812, which is hereby incorporated by reference in its entirety. This reference discloses an optical switching element in which each and every wavelength component can be directed from any given port to any other port without constraint. More specifically, unlike most optical switches, this switch is not limited to providing connections between a subset of input ports and a subset of output ports, or vice versa. Rather, this switch can also provide a connection between two ports within the same subset (either input or output). While the present invention may employ any of the aforementioned reconfigurable optical switches, the optical switch disclosed in U.S. patent application Ser. No. 09/691,812 will serve as an exemplary reconfigurable optical switch, and accordingly, additional details concerning this switch will be presented below in connection with FIG. 2. Of course, those of ordinary skill in the art will recognize that the invention is equally applicable to an all-optical modular OXC that employs any reconfigurable optical switch in which any wavelength component received on any input port can be selectively directed to any output port, independent of the routing of the other wavelengths.

Figure 2:
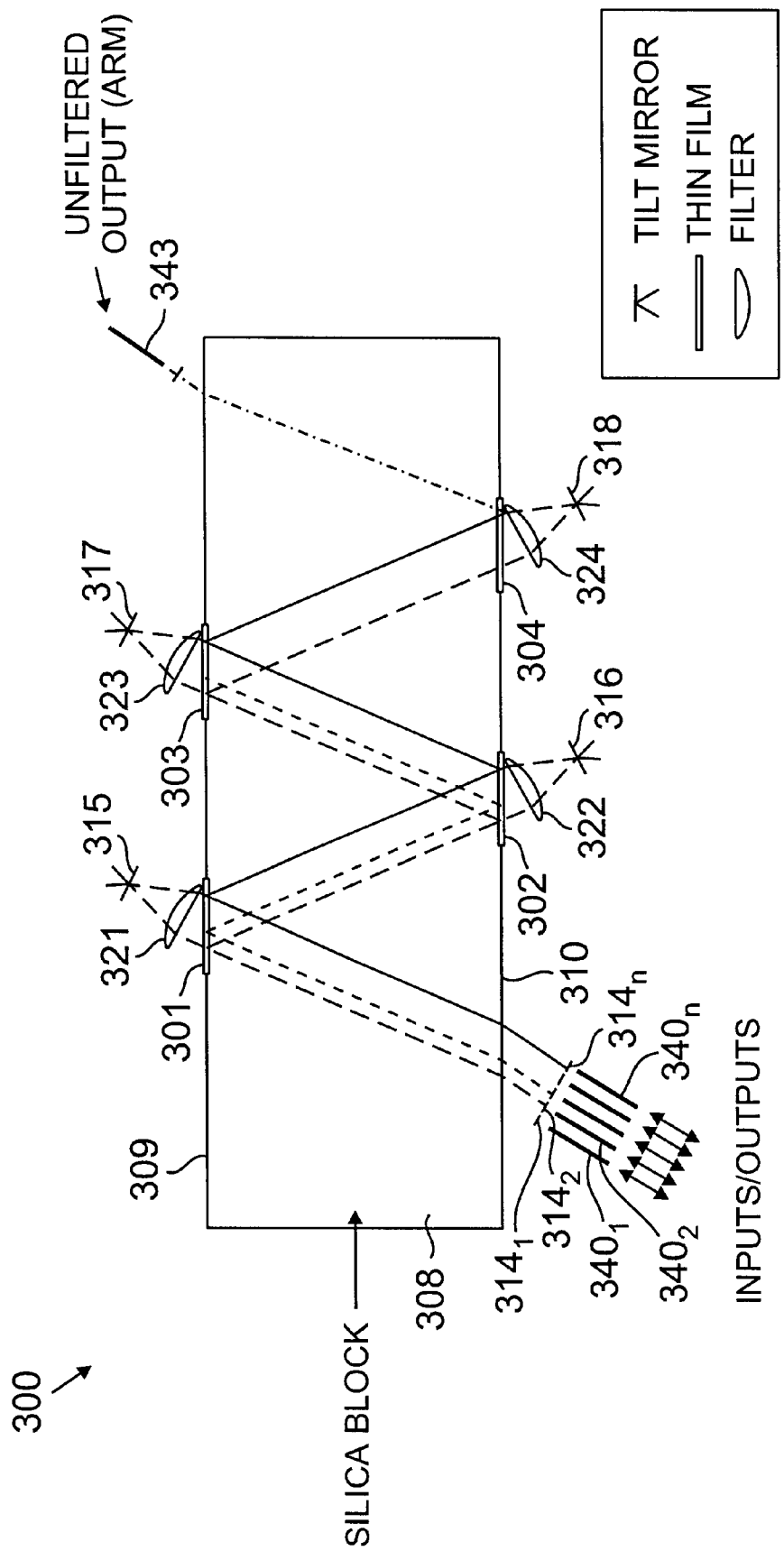
FIG. 2 shows an exemplary reconfigurable all-optical switch that may be employed in the present invention.

In FIG. 2, the reconfigurable optical switch 300 comprises an optically transparent substrate 308, a plurality of dielectric thin film filters 301, 302, 303, and 304, a plurality of collimating lens pairs 321, 322, 323, and 324, a plurality of tiltable mirrors 315, 316, 317, and 318 and a plurality of output ports $340_1$, $340_2$, . . . $340_n$. A first filter array is composed of thin film filters 301 and 303 and a second filter array is composed of thin film filters 302 and 304. Individual ones of the collimating lens pairs 321–324 and tiltable mirrors 315–318 are associated with each of the thin film filters. Each thin film filter, along with its associated collimating lens pair and tiltable mirror effectively forms a narrow band, free space switch, i.e. a switch that routes individual channels or wavelength components along different paths. The tiltable mirrors are micro mirrors such as the MEMS (microelectromechanical systems) mirrors. Alternatively, other mechanisms may be employed to control the position of the mirrors, such as piezoelectric actuators, for example.

In operation, a WDM optical signal composed of different wavelengths $\lambda_1$, $\lambda_2$, $\lambda_3$ and $\lambda_4$ is directed from the optical input port 312 to a collimator lens 314. The WDM signal traverses substrate 308 and is received by thin film filter 301. According to the characteristics of the thin film filter 301, the optical component with wavelength $\lambda_1$ is transmitted through the thin film filter 301, while the other wavelength components are reflected and directed to thin film filter 302 via substrate 308. The wavelength component $\lambda_1$, which is transmitted through the thin film filter 301, is converged by the collimating lens 321 onto the tiltable mirror 315. Tiltable mirror 315 is positioned so that wavelength component $\lambda_1$ is reflected from the mirror to a selected one of the output ports $340_1$–$340_n$ via thin film filters 302–304, which all reflect wavelength component $\lambda_1$. The particular output port that is selected to receive the wavelength component will determine the particular orientation of the mirror 315.

As mentioned, the remaining wavelength components $\lambda_2$, $\lambda_3$, and $\lambda_4$ are reflected by thin film filter 301 through lens 321 back into substrate 308 and directed to thin film filter 302. Wavelength component $\lambda_2$ is transmitted through thin film filter 302 and lens 322 and directed to a selected output port by tiltable mirror 316 via thin film filters 303–304, which all reflect wavelength component $\lambda_2$. Similarly, all other wavelength components are separated in sequence by the thin film filters 303–304 and subsequently directed by tiltable mirrors 317–318 to selected output ports. By appropriate actuation of the tiltable mirrors, each wavelength component can be directed to an output port that is selected independently of all other wavelength components.

Figure 3:
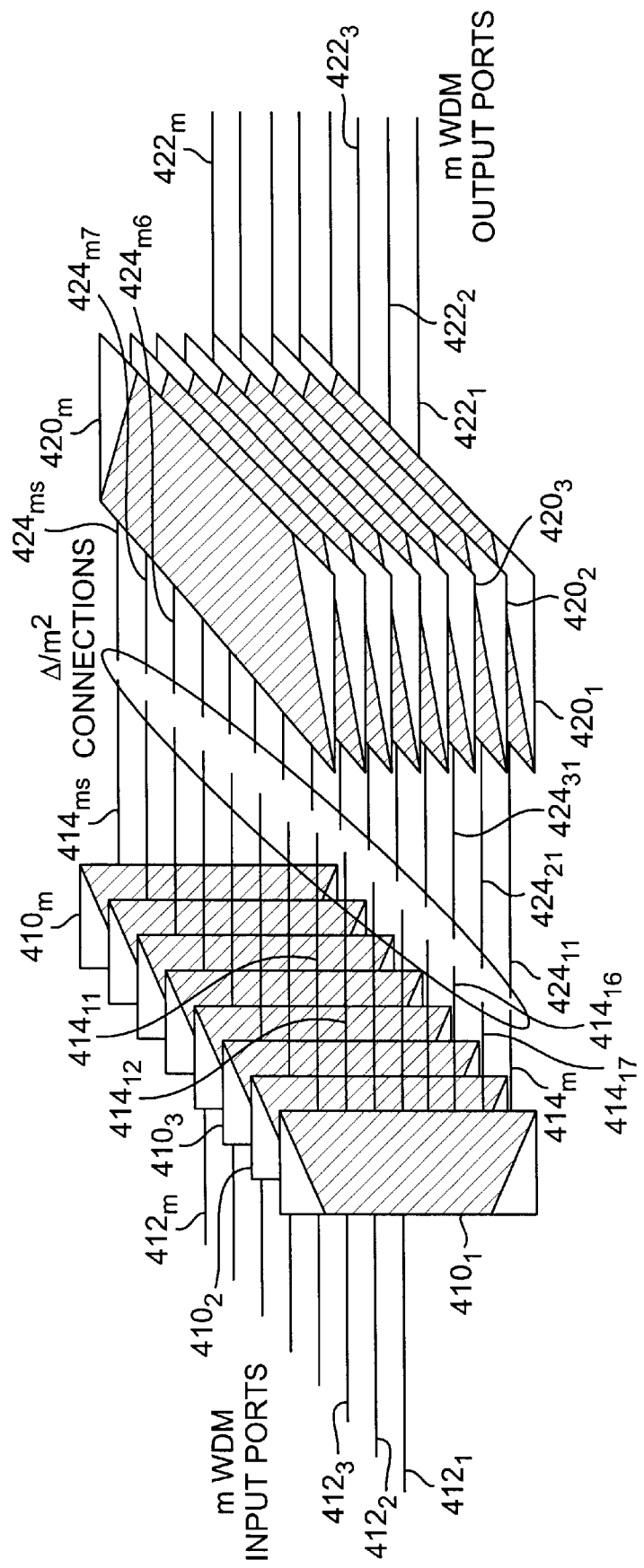
FIG. 3 shows an all-optical, optical cross-connect constructed in accordance with the present invention.

Referring now to FIG. 3, shown is one embodiment of a modular, all-optical, m×m cross-connect 400 in accordance with the present invention. OXC 400 can route any wavelength received on any of its m input ports 412 to any of its m output ports 422 independently of one another. In FIG. 3, for purposes of illustration only, m is depicted as equal to 8. It should be noted that the term "route" as used herein refers not only to the ability to selectively direct selected one or more wavelengths along a given path, but also the ability to prevent the transmission of any other wavelengths not being directed along that same path.

Cross-connect 400 includes a first series of reconfigurable optical switches $410_1, 410_2, \ldots 410_m$ and a second series of reconfigurable optical switches $420_1, 420_2, \ldots 420_m$. Reconfigurable optical switches 410 and 420 may be of the type illustrated in FIG. 2. Each of the first series of reconfigurable optical switches 410 has an input port 412 and m output ports 414. For example, in FIG. 3, switch $410_1$ has an input port $412_1$ and output ports $414_{11}, 414_{12}, \ldots 414_{1m}$ that are clearly visible. The remaining switches in the first series are likewise configured. Similarly, each of the second series of optical switches 420 has an output port 422 and m input ports 424. For example, in FIG. 3, switch $420_m$ has an output port $422_m$ and input ports $424_{m1}, 424_{m2}, \ldots 424_{mm}$ that are clearly visible. The reconfigurable optical switches in the first and second series of switches are interconnected in the following manner. The output ports of each switch in the first series are sequentially coupled to the input ports of the switches in the second series. For example, as can be seen in FIG. 3, output ports $414_{11}$–$414_{1m}$ of switch $410_1$ are respectively coupled to input ports $424_{m1}$–$424_{11}$ of switches $420_m$–$420_1$. In this way the $m^2$ outputs of the first series of switches are coupled to the $m^2$ inputs of the second series of switches, thus forming $m^2$ internal optical connections. It should be noted that depending on the cost of switches employed above relative to optical amplification, either the input or the output series of switches can be replaced with a 1×m passive coupler. If the input switches are replaced with a passive coupler, this routes a copy of all the wavelengths of all the input fibers to the second series of switches where only the desired signal is chosen to pass on. Alternately, the appropriate signals could be selected in the first series of switches, where the wavelengths are switched on a wavelength by wavelength basis to a specific passive coupler for a given output fiber. That coupler passively combines the wavelengths from each of the switches onto a single output fiber. While the passive coupler will be less expensive than an optical switch, it adds significant loss, which in turn will require an expensive amplifier. Hence the optimum configuration will depend on the cost of the switches, optical amplifiers, and the number of WDM fibers that are to be cross-connected (i.e., m).

Figure 1:
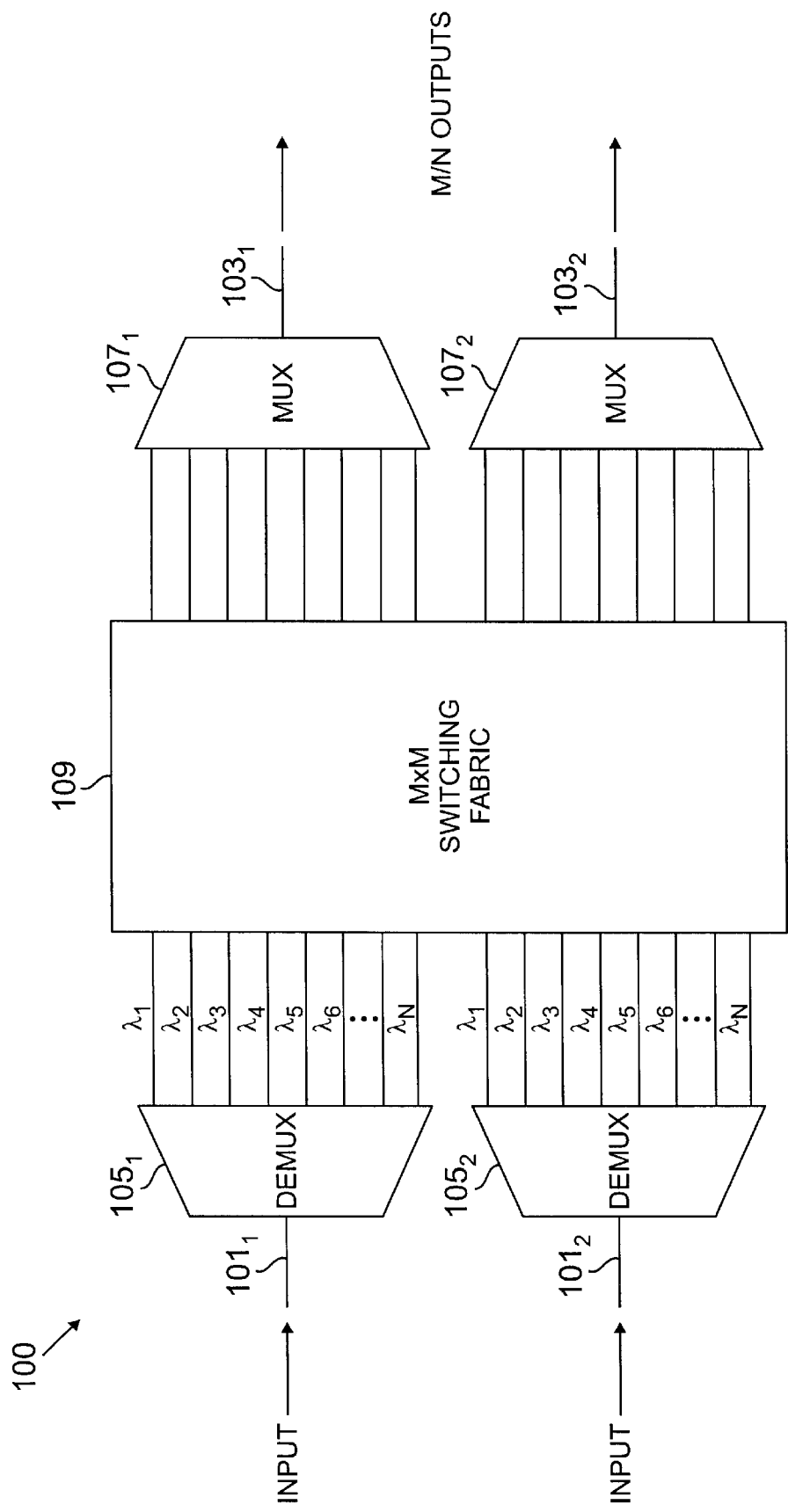
FIG. 1 shows a conventional optical cross-connect.

One important advantage of the all-optical OXC shown in FIG. 3 over the OXC shown in FIG. 1 is that when a large number of WDM channels are employed, the number of internal optical connections is far fewer in the OXC of FIG. 3 than in the OXC of FIG. 1. This is becoming an increasingly important factor as the number of WDM channels used in optical transmission systems has increased in recent years from 16 to 32, to even upwards of 160 channels in the most recent systems. In the OXC shown in FIG. 1, for instance, the number of internal connections is 2 mN, where m is the number of input and output ports on which WDM signals are communicated to and from the OXC, and N is the maximum number of channels in the WDM signal. In comparison, the inventive OXC shown in FIG. 3 has $m^2$ internal optical connections. In other words, in the present invention, the number of interconnections scales with the number of WDM input and output ports rather than with the number of channels.

Figure 4:
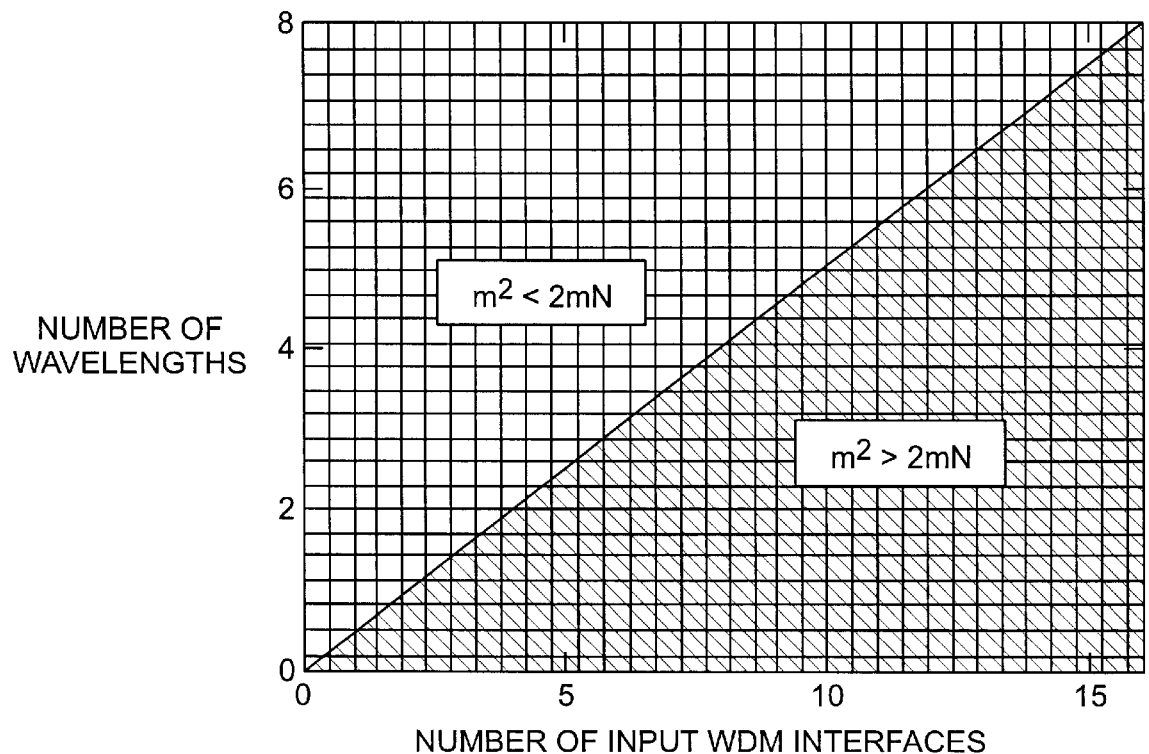
FIG. 4 shows the regimes in which the optical cross-connects of FIGS. 1 and 3 each require a fewer number of internal optical connections for various numbers of channels.
Figure 5:
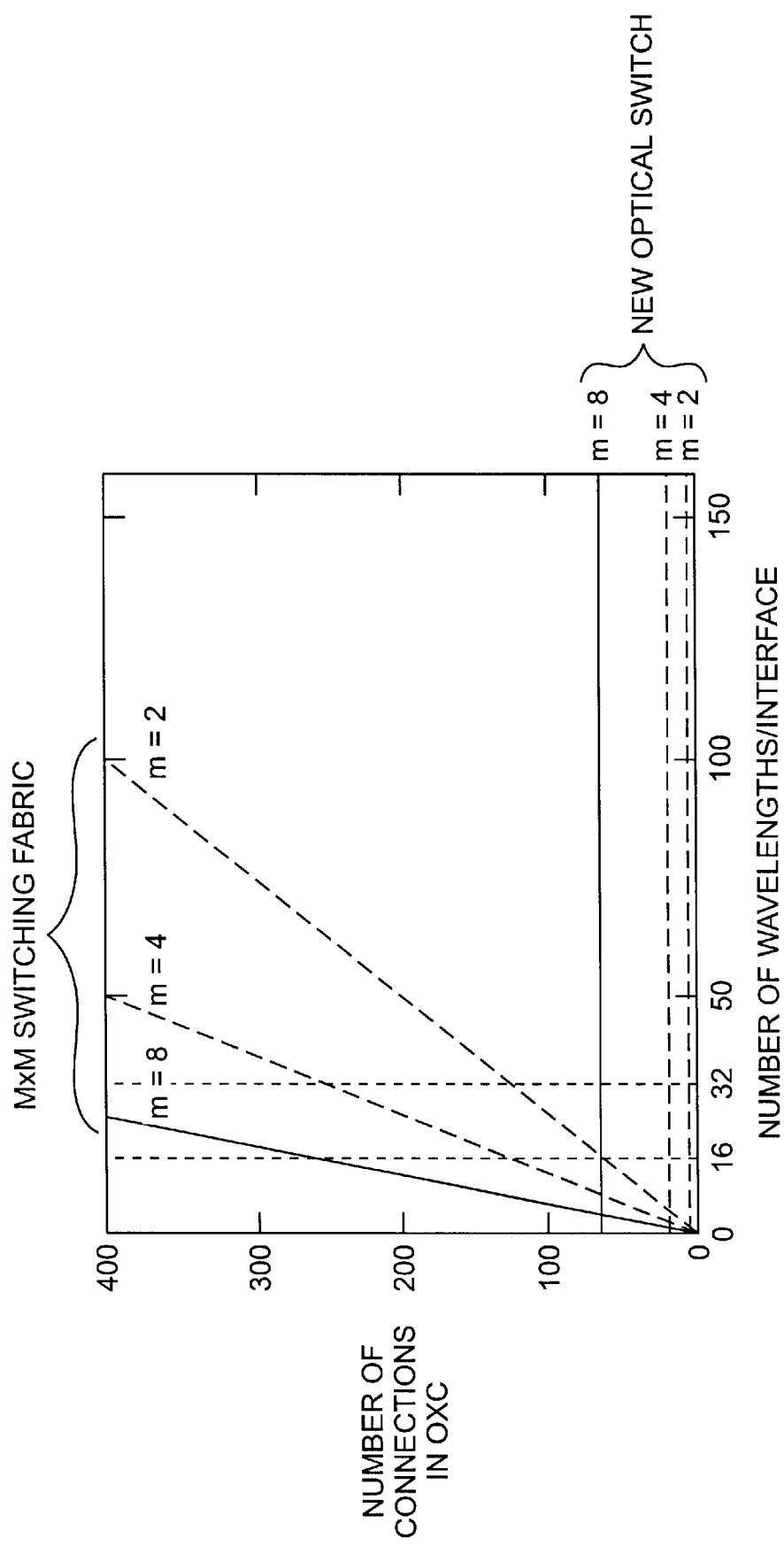
FIG. 5 compares the number of internal optical connections required for a various number of channels for both the conventional optical cross-connect of FIG. 1 and the inventive all-optical OXC of FIG. 3 when each cross-connect incorporates 2, 4 and 8 WDM input ports.

For a given optical cross-connect with N channels and m WDM input and output ports, FIG. 4 shows the regimes in which the OXCs of FIGS. 1 and 3 each require fewer numbers of optical connections. In particular, when the number of WDM input and output ports is less than twice the total number of channels, the OXC of the present invention will require a fewer number of optical connections, thereby reducing the cost and the physical space occupied by the OXC. The reduction in physical space is often particularly important for communications equipment, which frequently must reside in a specialized facility that is expensive to procure on a square-footage basis. FIG. 5 shows how large the discrepancy can be in the number of connections between the two OXC's when employed in current networks, where the number of channels is increasing more rapidly than the number of WDM input and output ports. In FIG. 5 the number of internal connections required for a various number of channels is shown for both a conventional OXC and the inventive all-optical OXC for 2, 4 and 8 WDM input ports. For example, a conventional 32 channel OXC having 4 WDM inputs and outputs requires four multipexers and four demultiplexers each designed to respectively multiplex and demultiplex 32 channels and a 128×128 digital switching fabric, yielding a total of 256 internal optical connections. In contrast, the inventive all-optical OXC can achieve the same functionality with 8 reconfigurable optical switches, yielding a total of 16 internal connections. Moreover, the inventive OXC is smaller, easier to fabricate, and likely to provide lower loss.

Figure 6:
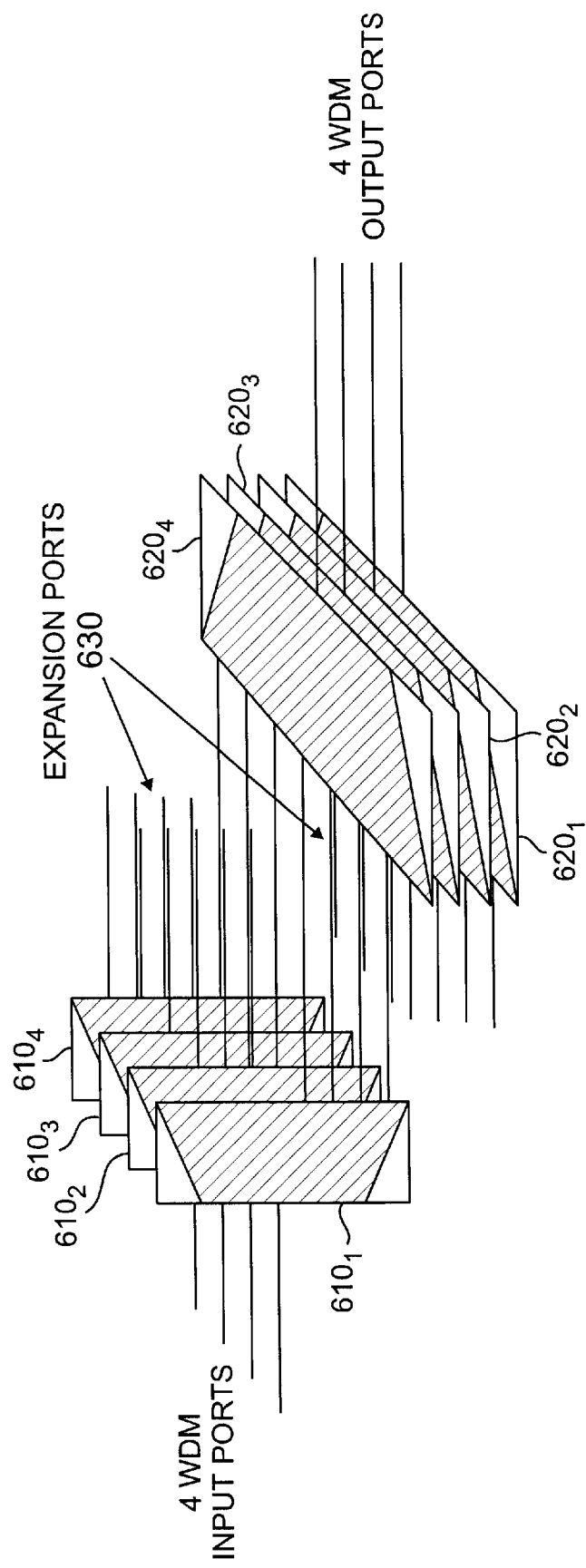
FIG. 6 shows the inventive optical-cross connect in which expansion ports are available for increasing the capacity of the cross-connect in a modular fashion by adding additional reconfigurable optical switches.

Another important advantage of the all-optical OXC shown in FIG. 3 over the OXC shown in FIG. 1 is that it can be installed and upgraded in a modular fashion. In particular, if the OXC is initially provisioned with "x" WDM input and output ports and, hence employs a total of "2x" reconfigurable optical switches, the number of WDM input and output ports can be expanded to m (where x<m) by the addition of (m−x) additional reconfigurable optical switches. This presumes, of course, that the original x optical switches are initially provisioned with m output ports (in the case of first series of optical switches connected to the WDM input ports) and m input ports (in the case of the second series of optical switches connected to the WDM output ports). These additional (m−x) ports serve as expansion ports that can be connected to the additional (m−x) reconfigurable optical switches when such additional capacity is required. For example, FIG. 6 shows an OXC constructed in accordance with the present invention that is initially provisioned for 4 WDM input and output ports. As shown, the reconfigurable optical switches 610 and 620 have expansion ports 630 that can be utilized when additional reconfigurable switches are to be incorporated into the OXC.

The modular functionality offered by the present invention arises because only one internal optical connection is required to establish a communication path for each and every channel between any given WDM input port and any given WDM output port. For instance, a reconfigurable optical switch with a total of 9 ports can reserve one port as a WDM input or output port to the OXC while the remaining ports can be used to establish the internal optical connections to other optical switches in the OXC. As a consequence of this ability the present invention provides a modular OXC that can be expanded simply by adding additional reconfigurable optical switches when extra capacity is required. In this way the majority of the capital costs associated with the extra capacity are not incurred until the extra capacity is actually needed. In contrast, the OXC shown in FIG. 1 requires that a substantial portion of the entire cost associated with increasing capacity be incurred when the OXC is initially installed.

What is claimed is:

1. An all-optical, optical cross-connect, comprising:

first and second pluralities of multiport optical devices, said first plurality of multiport optical devices having at least one input port for receiving a WDM optical signal and a plurality of output ports for selectively receiving one or more wavelength components of the optical signal, said second plurality of multiport optical devices having a plurality of input ports for selectively receiving one or more wavelength components of the optical signal and at least one output port for selectively receiving one or more wavelength components of the optical signal, wherein at least one of said first or second plurality of multiport optical devices are all-optical switches that can route every wavelength component independently of every other wavelength component.

2. An all-optical, optical cross-connect, comprising:

first and second pluralities of multiport optical devices, said first plurality of multiport optical devices having at least one input port for receiving a WDM optical signal and a plurality of output ports for selectively receiving one or more wavelength components of the optical signal, said second plurality of multiport optical devices having a plurality of input ports for selectively receiving one or more wavelength components of the optical signal and at least one output port for selectively receiving one or more wavelength components of the optical signal, wherein at least one of said first or second plurality of multiport optical devices are couplers.

3. An all-optical, optical cross-connect, comprising:

first and second pluralities of multiport optical devices, said first plurality of multiport optical devices having at least one input port for receiving a WDM optical signal and a plurality of output ports for selectively receiving one or more wavelength components of the optical signal, said second plurality of multiport optical devices having a plurality of input ports for selectively receiving one or more wavelength components of the optical signal and at least one output port for selectively receiving one or more wavelength components of the optical signal, wherein at least one of said first or second plurality of multiport optical devices are all-optical switches that can route every wavelength component independently of every other wavelength component, and wherein said all-optical switches comprise a plurality of wavelength selective elements that each select a channel wavelength from among the plurality of wavelength components received at the at least one input port; and a plurality of optical elements respectively associated with said plurality of wavelength selective elements, each of said optical elements directing one of the selected wavelength components selected by the associated wavelength selective element to any one of the output ports independently of all other channel wavelengths.

4. The optical cross-connect of claim 1 wherein each of said all-optical switches comprising:

a plurality of wavelength selective elements that each select a channel wavelength from among the plurality of wavelength components received at the at least one input port; and a plurality of optical elements respectively associated with said plurality of wavelength selective elements, each of said optical elements directing one of the selected wavelength component selected by the associated wavelength selective element to any one of the output ports independently of all other wavelength components.

5. The optical cross-connect of claim 3 wherein said optical elements each include a tiltable mirror.

6. The optical cross-connect of claim 3 further comprising a free space region disposed between the input ports and the wavelength selective elements.

7. The optical cross-connect of claim 3 wherein said optical elements retroreflect said channel wavelengths.

8. The optical cross-connect of claim 3 wherein said wavelength selective elements are thin film filters each transmitting therethrough a different one of the wavelength components and reflecting the remaining channel wavelengths.

9. The optical cross-connect of claim 3 wherein said optical elements are reflective mirrors that are selectively tiltable in a plurality of positions such that in each of the positions the mirrors reflect the wavelength component incident thereon to any selected one of the output ports.

10. The optical cross-connect of claim 9 wherein said reflective mirrors are part of a micro-electromechanical (MEM) reflective mirror assembly.

11. The optical cross-connect of claim 10 wherein said reflective mirror assembly is a retroreflective mirror assembly.

12. The optical cross-connect of claim 9 wherein said reflective mirrors are part of a retroreflective optical assembly.

13. The optical cross-connect of claim 9 wherein said reflective mirrors each include a piezoelectric actuator.

14. The optical cross-connect of claim 6 wherein said free space region comprises an optically transparent substrate having first and second parallel surfaces, said wavelength selective element includes a plurality of wavelength selective elements arranged in first and second arrays extending along the first and second parallel surfaces, respectively.

15. The optical cross-connect of claim 14 wherein the optically transparent substrate includes air as a medium in which the optical signal propagates.

16. The optical cross-connect of claim 14 where the optically transparent substrate is silica glass.

17. The optical cross-connect of claim 14 wherein said first and second arrays are laterally offset with respect to one another.

18. The optical cross-connect of claim 17 wherein each of said wavelength selective elements arranged in the first array direct the selected wavelength component to another of said wavelength selective elements arranged in the second array.

19. The optical cross-connect of claim 3 further comprising a collimating lens disposed between each one of said wavelength selective elements and the optical element associated therewith, each of said optical elements being positioned at a focal point of the lens associated therewith.

20. An all-optical, optical cross-connect, comprising:

a first set of m reconfigurable all-optical switches, where m is ∞3, each of said reconfigurable switches having at least (m+1) prearranged ports for receiving one or more wavelength components of a WDM optical signal, said reconfigurable switches selectively directing any wavelength component from one of the prearranged ports to any of the remaining ones of the prearranged ports independently of every other wavelength component;

a second set of m reconfigurable all-optical switches each having at least (m+1) particular ports for receiving one or more wavelength components of a WDM optical signal, said reconfigurable switches routing any wavelength component from one of the particular ports to any of the remaining ones of the particular ports independently of every other wavelength component; and wherein each of the prearranged ports of each reconfigurable switch in the first set of switches is optically coupled to a particular port of a different reconfigurable switch in the second set of switches.

21. The optical cross-connect of claim 20 wherein each of said m reconfigurable switches in the first set of switches have at least (m+2) prearranged ports and said m reconfigurable switches in the second set of switches have at least (m+2) particular ports.

22. The optical cross-connect of claim 20 wherein each of said all-optical switches comprising:

a plurality of wavelength selective elements that each select a wavelength component from among the wavelength components of the WDM optical signal received at one of the input port; and a plurality of optical elements respectively associated with said plurality of wavelength selective elements, each of said optical elements directing one of the selected wavelength components selected by the associated wavelength selective element to any one of the ports independently of all other channel wavelengths.

23. The optical cross-connect of claim 22 wherein said optical elements each include a tiltable mirror.

24. The optical cross-connect of claim 22 further comprising a free space region disposed between the ports and the wavelength selective elements.

25. The optical cross-connect of claim 22 wherein said optical elements retroreflect said channel wavelengths.

26. The optical cross-connect of claim 3 wherein said wavelength selective elements are thin film filters each transmitting therethrough a different one of the wavelength components and reflecting the remaining wavelength components.

27. The optical cross-connect of claim 22 wherein said optical elements are reflective mirrors that are selectively tiltable in a plurality of positions such that in each of the positions the mirrors reflect the wavelength component incident thereon to any selected one of the output ports.

28. The optical switch of claim 27 wherein said reflective mirrors are part of a micro-electromechanical (MEM) reflective mirror assembly.

29. The optical cross-connect of claim 28 wherein said reflective mirror assembly is a retroreflective mirror assembly.

30. The optical switch of claim 27 wherein said reflective mirrors are part of a retroreflective optical assembly.

31. The optical switch of claim 27 wherein said reflective mirrors each include a piezoelectric actuator.

32. The optical switch of claim 24 wherein said free space region comprises an optically transparent substrate having first and second parallel surfaces, said wavelength selective element includes a plurality of wavelength selective elements arranged in first and second arrays extending along the first and second parallel surfaces, respectively.

33. The optical switch of claim 32 wherein the optically transparent substrate includes air as a medium in which the optical signal propagates.

34. The optical switch of claim 32 where the optically transparent substrate is silica glass.

35. The optical switch of claim 32 wherein said first and second arrays are laterally offset with respect to one another.

36. The optical switch of claim 35 wherein each of said wavelength selective elements arranged in the first array direct the selected wavelength component to another of said wavelength selective elements arranged in the second array.

37. The optical switch of claim 22 further comprising a collimating lens disposed between each one of said wavelength selective elements and the optical element associated therewith, each of said optical elements being positioned at a focal point of the lens associated therewith.

* * * * *

UNITED STATES PATENT AND TRADEMARK OFFICE
CERTIFICATE OF CORRECTION

PATENT NO.         : 6,614,953 B2
APPLICATION NO. : 10/098746
DATED                 : September 2, 2003
INVENTOR(S)       : Thomas Andrew Strasser et al.

It is certified that error appears in the above-identified patent and that said Letters Patent is hereby corrected as shown below:

Title Page, Abstract (57), line 10, after "one", change "of" to -- or -- .

Col. 2, line 28, after "devices", change "have" to -- has -- .

Col. 2, line 32, after "devices", change "have" to -- has -- .

Col. 2, line 63, after "switches", change "have" to -- has -- .

Col. 2, line 66, after "selectively", change "directing" to -- direct --.

Col. 4, line 36, change "X$_2$" to -- $\lambda_2$ -- .

Col. 4, line 41, after "wavelength" change "$_1$" to -- $\lambda_1$ -- .

-- wavelength-selective--

Col. 5, line 40, after "will" insert -- be -- .

Col. 5, line 41, before "basis" change, "wavelength by wavelength" to

-- wavelength-by-wavelength -- .

Col. 6, line 40, before "first" insert -- the -- .

Col. 6, line 61, after "ability" insert -- , -- .

Claim 4, Col. 7, line 63, after "switches", change "comprising" to -- comprises-- .

Claim 4, Col. 7, line 64, before "elements", change "wavelength selective" to

-- wavelength-selective-- .

Claim 4, Col. 8, line 2, before "elements", change "wavelength selective" to

-- wavelength-selective--.

Claim 4, Col. 8, line 4, before "selected", change "component" to-- components--.

Claim 4, Col. 8, line 5, before "element", change "wavelength selective" to

-- wavelength-selective--.

UNITED STATES PATENT AND TRADEMARK OFFICE
CERTIFICATE OF CORRECTION

PATENT NO.        : 6,614,953 B2
APPLICATION NO.   : 10/098746
DATED             : September 2, 2003
INVENTOR(S)       : Thomas Andrew Strasser et al.

It is certified that error appears in the above-identified patent and that said Letters Patent is hereby corrected as shown below:

Claim 6, Col. 8, line 12, before "elements", change "wavelength selective" to

-- wavelength-selective--.

Claim 8, Col. 8, line 16, before "elements", change "wavelength selective" to

-- wavelength-selective--.

Claim 14, Col. 8, line 38-39, before "element", change "wavelength selective" to -- wavelength-selective--.

Claim 14, Col. 8, line 39-40, before "elements", change "wavelength selective" to -- wavelength-selective--.

Claim 18, Col. 8, line 51, before "elements", change "wavelength selective" to

-- wavelength-selective--.

Claim 18, Col. 8, line 53, before "elements", change "wavelength selective" to

-- wavelength-selective--.

Claim 19, Col. 8, line 56, before "elements", change "wavelength selective" to

-- wavelength-selective--

Claim 22, Col. 9, line 18, after "switches", change "comprising" to -- comprises-- .

Claim 22, Col. 9, line 19, before "elements", change "wavelength selective" to

-- wavelength-selective--

Claim 22, Col. 9, line 22, after "input", change "port." to -- ports-- .

Claim 22, Col. 9, line 27, before "element", change "wavelength selective" to

-- wavelength-selective--

UNITED STATES PATENT AND TRADEMARK OFFICE
CERTIFICATE OF CORRECTION

| | |
|---|---|
| PATENT NO. | : 6,614,953 B2 |
| APPLICATION NO. | : 10/098746 |
| DATED | : September 2, 2003 |
| INVENTOR(S) | : Thomas Andrew Strasser et al. |

It is certified that error appears in the above-identified patent and that said Letters Patent is hereby corrected as shown below:

Claim 24, Col. 9, line 33, before "elements", change "wavelength selective" to

-- wavelength-selective--

Claim 32, Col. 10, line 19, after "said", change "wavelength selective" to

-- wavelength-selective--

Claim 32, Col. 10, line 20, after "of", change "wavelength selective" to

-- wavelength-selective--

Claim 36, Col. 10, line 30, before "elements", change "wavelength selective" to

-- wavelength-selective--

Claim 36, Col. 10, line 32, before "elements", change "wavelength selective" to

-- wavelength-selective--

Claim 37, Col. 10, line 34-35, before "elements", change "wavelength selective" to -- wavelength-selective--

Signed and Sealed this

Fourteenth Day of August, 2007

JON W. DUDAS
*Director of the United States Patent and Trademark Office*